UNITED STATES PATENT OFFICE.

LUDWIG KURZ, OF HAGENAU, ALSACE LORRAINE, GERMANY.

PROCESS OF MAKING PRESERVED MEAT.

No. 863,926.  Specification of Letters Patent.  Patented Aug. 20, 1907.

Application filed December 5, 1906. Serial No. 346,359.

*To all whom it may concern:*

Be it known that I, LUDWIG KURZ, a subject of the King of Prussia, German Emperor, and a resident of the city of Hagenau, Alsace Lorraine, Germany, have invented a new and useful Improvement in Processes of Making Preserved Meat, of which the following is a full, clear, and exact description.

This invention relates to a novel process of making preserved meats by means of which practically all parts of the cattle are worked up into such preserved meats whereby a cheap product is obtained which is particularly well adapted for large supplies, such as army supplies.

It is the special object of this invention to produce a cheap preserved food which is of delightful taste and very stiff so that it can be cut easily into slices or pieces of regular form. The stiffness of the preserved food made according to this process is obtained to an exceedingly high degree by mixing raw dried and salted minced meat with pickled and boiled sinewy meat in a chopped up condition. In addition to the above qualities the preserved food thus obtained is extremely nourishing.

In carrying out my novel process I substantially proceed as follows:—

The trunks of the slaughtered cattle are cut up and the various parts of the body of each slaughtered animal assorted. The sinewy and if desired the fatty parts are pickled and then boiled while the lean parts which are free from sinews are dried, salted, and then minced. The brine for pickling the sinewy and fatty parts should not be too strong, it consists of a good quality of ordinary salt with a proper addition of cane sugar and if desired some saltpeter. The lean parts such as round and buttock which are without sinews are salted dry. For every 1000 parts of meat 50 parts of salt, 3 parts of cane sugar and if desired 3 parts of saltpeter are used. As soon as the lean parts of meat have been thoroughly salted they are chopped raw and cooled in a refrigerator chamber. During the same time the sinewy and fatty parts of the meat such as legs, thin flanks, shoulders, etc., will have been pickled for which process about 8–10 days are required. Care must be taken that both the pickled and the minced meat retain a mild and agreeable taste. The sinewy pickled meat and fatty parts are now slowly but well cooked so that same remain stiff and grainy. This meat is then chilled in cold water for the purpose of preventing any loss of fat or meat juice when the meat is removed from the bones. After this has been done, the meat is cut up into oblong slices and all the strong sinews of the legs are separated. The separated sinews which are still hard are thoroughly boiled down in the water in which the pickled meat has been cooked whereby a strong beef tea is obtained. The boiled strong sinews are separated from the beef tea and pass through a meat chopper. The chopped mass is then mixed with the jellied beef tea to form a thin mash. The dry and salted lean parts are chopped up raw either by means of a chopping knife or a meat chopper and at the same time seasoned with spice such as pepper and coriander. This chopped up mass is mixed with the above mentioned mash, if necessary with the aid of a meat cutter. The resulting mixture has excellent cementing qualities. This mixture prepared from the dry salted and chopped up raw lean parts and the mash made of the pickled boiled and chopped strong sinews with the beef tea is now mixed with the oblong slices of the pickled and cooked parts of meat which remained after the strong sinews had been removed. The finished product is forced into tins which are closed, tested and heated in the well known manner. After the tins have been well cooled in water and if desired covered with a protecting coating they are ready for shipping.

Of particular importance for this process is the treatment of the cattle before it is slaughtered. After transportation the animals should be allowed sufficient rest. If possible the slaughtering should be done in the forenoon and the trunks cut up immediately so that the nitrogenous and aqueous vapors of the meat may be taken up by the air. The meat is then allowed to cool well, say until next morning.

The novel process may be carried out with or without the addition of the beef tea which in itself does not increase the stiffness of the final product. Beef tea, however, is very nourishing and as it also helps to decrease the cost of production it is advisable to use it. The product obtained without the addition of beef tea from dry, salted, raw minced meat of the lean parts and the pickled, cooked sinewy meat attains even a greater stiffness than practically required. The pickled, cooked, sinewy meat contains sufficient gelatinous matter to cement the final product together when same is forced into the tins and again heated.

The following table gives a few recipes according to which my process may be advantageously carried into practice.

I. Salted beef (corned beef): 7 parts of pickled boiled salt beef, 2 parts of raw dry salted chopped minced beef, 1 part of boiled pickled sinewy meat, 1 part of boiled down jelly with the necessary spice.

II. Pickled pork (corned pork): 7 parts of pickled boiled brawn, 2 parts of pickled raw lean minced pork, 1 part of pickled ground sinewy pork, 1 part of boiled down jelly with the necessary spice.

III. Pickled beef and pork: 4 parts of pickled boiled beef, 4 parts of pickled boiled pork, 2 parts of minced raw dry salted beef, 1 part of dry salted minced raw pork, 1 part of pickled boiled ground sinewy meat, 1 part of boiled down jelly with the necessary spice.

Having thus described my invention I claim as new and desire to secure by Letters Patent:—

The process of producing stiff preserved food, adapted to be cut into slices of regular form, consisting in salting dry raw meat of the lean parts and chopping and seasoning same, pickling separately the sinewy and fatty parts, boiling said pickled sinewy and fatty meat, chilling it in cold water, cutting it into slices, removing therefrom the thick and still hard sinews, and boiling them in the meat broth, separating the softly boiled sinews from the broth and chopping them fine, mixing the chopped sinews with the jellied broth to form a mash, incorporating the raw, pickled and chopped up mince meat of the lean parts with the jellied broth to form a cementing mixture, and mixing the cementing mixture with the cut up slices of the pickled, cooked and cut up sinewy meat, whereby a product is obtained ready to be canned and shipped.

In witness whereof I have hereunto signed my name this 15th day of November, 1906, in the presence of two subscribing witnesses.

LUDWIG KURZ.

Witnesses:
 WANDA JECKER,
 MARTHA BRITTAIN.